United States Patent
Kushner et al.

(10) Patent No.: US 7,137,445 B2
(45) Date of Patent: Nov. 21, 2006

(54) HVAC CENTER PLATE SCOOP FOR IMPROVED TEMPERATURE DISTRIBUTION

(75) Inventors: Dan Kushner, Berkley, MI (US); Dan Archibald, Troy, MI (US)

(73) Assignee: Denso International America, Inc., Southfield, MI (US)

( * ) Notice: Subject to any disclaimer, the term of this patent is extended or adjusted under 35 U.S.C. 154(b) by 35 days.

(21) Appl. No.: 10/869,727

(22) Filed: Jun. 16, 2004

(65) Prior Publication Data

US 2005/0279489 A1 Dec. 22, 2005

(51) Int. Cl.
  *B60H 1/00* (2006.01)
  *B60H 3/00* (2006.01)
  *B60H 1/32* (2006.01)

(52) U.S. Cl. ............ 165/203; 165/42; 165/43; 454/156; 454/160; 454/161; 237/12.3 A; 237/12.3 B; 62/244

(58) Field of Classification Search .............. 165/42, 165/43, 203, 202, 204; 454/156, 160, 161; 237/12.3 A, 12.3 B; 62/244
See application file for complete search history.

(56) References Cited

U.S. PATENT DOCUMENTS 5,305,823 A * 4/1994 Elliot ..................... 165/41
6,019,163 A * 2/2000 Saida et al. ............. 165/42
6,675,598 B1 * 1/2004 Kaneura et al. .......... 62/244
6,799,432 B1 * 10/2004 Nagaya et al. ........... 62/244

FOREIGN PATENT DOCUMENTS

JP 2001001739 A * 1/2001

* cited by examiner

*Primary Examiner*—John K. Ford
(74) *Attorney, Agent, or Firm*—Harness, Dickey & Pierce, PLC

(57) ABSTRACT

An HVAC assembly including an HVAC case disposed in a passenger compartment of the vehicle includes a heater core having an upstream side and a downstream side. The heater core accepts air from the upstream side and exhausts air to the downstream side. The exhausted air defines a temperature gradient along a plane of the heater core. An air diverting member is positioned on the downstream side proximate the heater core. The air diverting member includes a first portion aligned for accepting air from a first region of the temperature gradient and a second portion for delivering the accepted air toward a second region of the temperature gradient. The first region has a higher air temperature than the second region.

18 Claims, 4 Drawing Sheets

HVAC CENTER PLATE SCOOP FOR IMPROVED TEMPERATURE DISTRIBUTION

FIELD OF THE INVENTION

The present invention relates to HVAC systems in vehicles and more particularly to an HVAC case arrangement having a center plate downstream of a heater core for redirecting air in a more uniform temperature distribution.

BACKGROUND OF THE INVENTION

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that cooperates with an evaporator for absorbing heat from the air in the vehicle. The heater core and evaporator are typically provided in an HVAC case located in the passenger compartment of the vehicle.

In some vehicles, the climate control system is adapted to control three zones of the cabin space. Generally, the three zones include the driver's side, the passenger's side and the rear occupant zone. The HVAC case typically includes ducting to accommodate air distribution to these appropriate zones as desired. The heater core is generally disposed downstream of a fan for communicating warmed air into the passenger compartment.

A heater core typically does not produce uniform temperature distribution across its plane due, in part, to placement of the water inlet. As a result, a temperature gradient is observed along the heater core. With a three zone HVAC configuration, sometimes an undesirable temperature imbalance is observed between the driver and the passenger sides of the case. Conventional methods to compensate for the temperature imbalance are to increase tank depth of the heater core, increase thickness of the heater core, or shift the entire heater core to one side of the case. All of these options involve costly tooling changes and can have a negative impact in terms of airflow volume and noise.

SUMMARY OF THE INVENTION

An HVAC assembly including an HVAC case disposed in a passenger compartment of the vehicle includes a heater core having an upstream side and a downstream side. The heater core accepts air from the upstream side and exhausts air to the downstream side. The exhausted air defines a temperature gradient along a plane of the heater core. An air diverting member is positioned on the downstream side proximate the heater core. The air diverting member includes a first portion aligned for accepting air from a first region of the temperature gradient and a second portion for delivering the accepted air toward a second region of the temperature gradient. The first region has a higher air temperature than the second region According to other features, the air diverting member is disposed on a center plate. The center plate defines a longitudinal axis substantially transverse to the plane of the heater core. The heater plate is coupled to the heater core. The first portion of the air diverting member defines an intake plane substantially parallel to the heater core plane. The second portion of the air diverting member defines an exhaust plane substantially transverse to the heater core plane. The air diverting member defines an annular wall extending between the intake plane and the exhaust plane. The center plate is arranged substantially at a midpoint of the heater core plane.

An HVAC assembly for delivering air to a passenger compartment of an automobile includes an HVAC case and a heater core disposed in the HVAC case. The heater core is adapted to pass air through a plane of the heater core and influence downstream air having a temperature gradient along the plane. An air redirecting member is disposed in the HVAC case downstream of the heater core. The air redirecting member includes an air accepting portion aligned to accept air from a first region of the temperature gradient and an air release portion aligned to release air into a second region of the temperature gradient. The first region defines air having a higher temperature than the second region.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
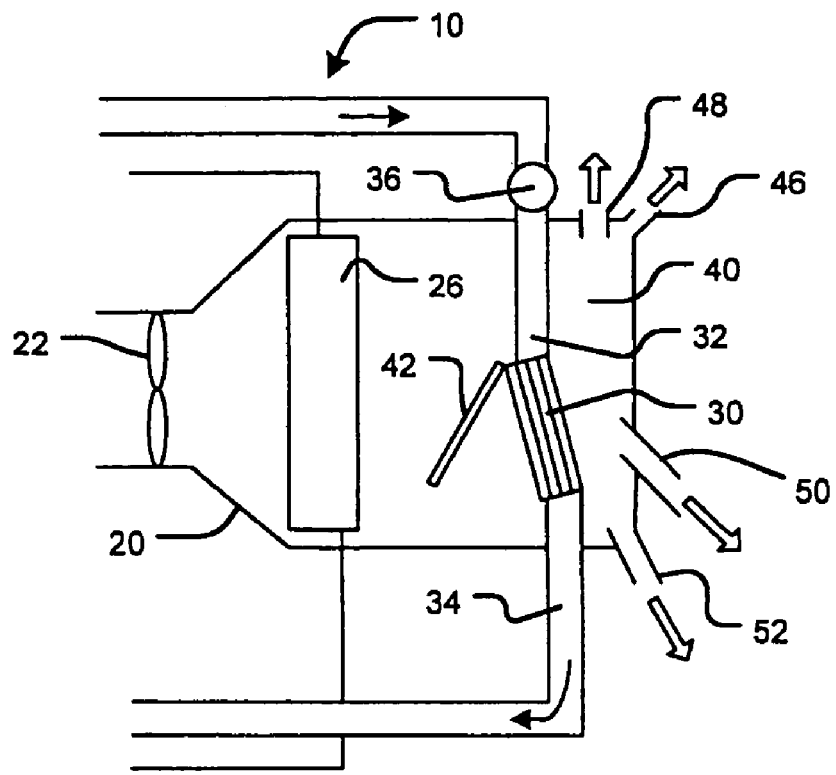
FIG. 1 is a functional block diagram of an HVAC system of a vehicle.

With initial reference to FIG. 1, a block diagram of a conventional vehicle HVAC system is shown and generally identified at reference 10. An HVAC case 20 forms a ventilation duct through which air conditioned and/or heated air is sent into the passenger compartment. The HVAC case 20 contains a fan 22 which is arranged on the upstream side of an evaporator 26. Low pressure refrigerant flowing into the evaporator 26 absorbs heat from the air inside the HVAC case 20 for evaporation. An inside/outside air switch box (not shown) is arranged on the suction side of the fan 22 (the left side in FIG. 1). The air inside the passenger compartment (inside air) or the air outside the passenger compartment (outside air) switched and introduced through the inside/outside air switch box is sent into the HVAC case 20 by the fan 22.

The HVAC case 20 accommodates, on the downstream side of the evaporator 26, a hot water heater core (heat exchanger) 30. The heater core 30 includes an inlet pipe 32 and an outlet pipe 34. Hot water (coolant) of the vehicle engine (not shown) is directed to the heater core 30 through the inlet pipe 32 by a water pump (not shown). A water valve 36 may be incorporated to control the flow volume of engine coolant supplied to the heater core 30.

A bypass channel 40 is formed beside the hot water heater core 30. An air mix door 42 is provided to adjust the volume ratio between warm air and cool air that passes through the hot water heater core 30 and the bypass channel 40, respectively. The air mix door 42 adjusts the temperature of the air blown into the passenger compartment by adjusting the volume ratio between the warm air and the cool air.

Additionally, a face outlet 46, a defroster outlet 48, a foot outlet 50 and a rear cabin outlet 52 are formed at the downstream end of the HVAC case 20. The face outlet 46 directs air toward the upper body portions of passengers, the defroster outlet 48 directs air toward the internal surface of a windshield, the foot outlet 50 directs air toward the feet of the front seat passengers and the rear cabin outlet 52 directs air toward the rear seat passengers of the vehicle. The outlets 46–52 are opened and closed by outlet mode doors (not shown). The air mix door 42 and the outlet mode doors mentioned above are driven by such electric driving devices such as servo motors via linkages or the like.

Figure 2:
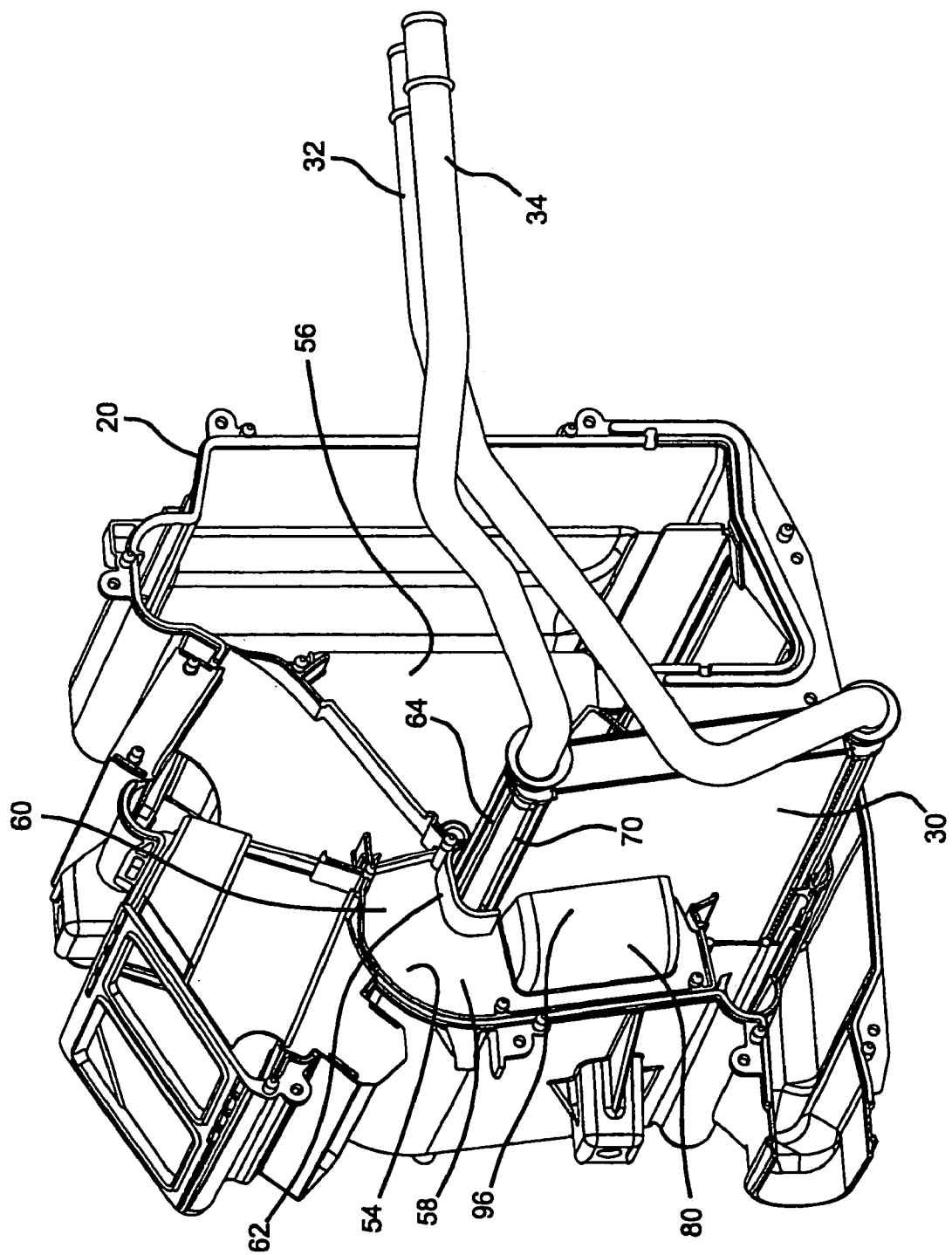
FIG. 2 is a partial cutaway view of the HVAC case according to the present teachings.
Figure 3:
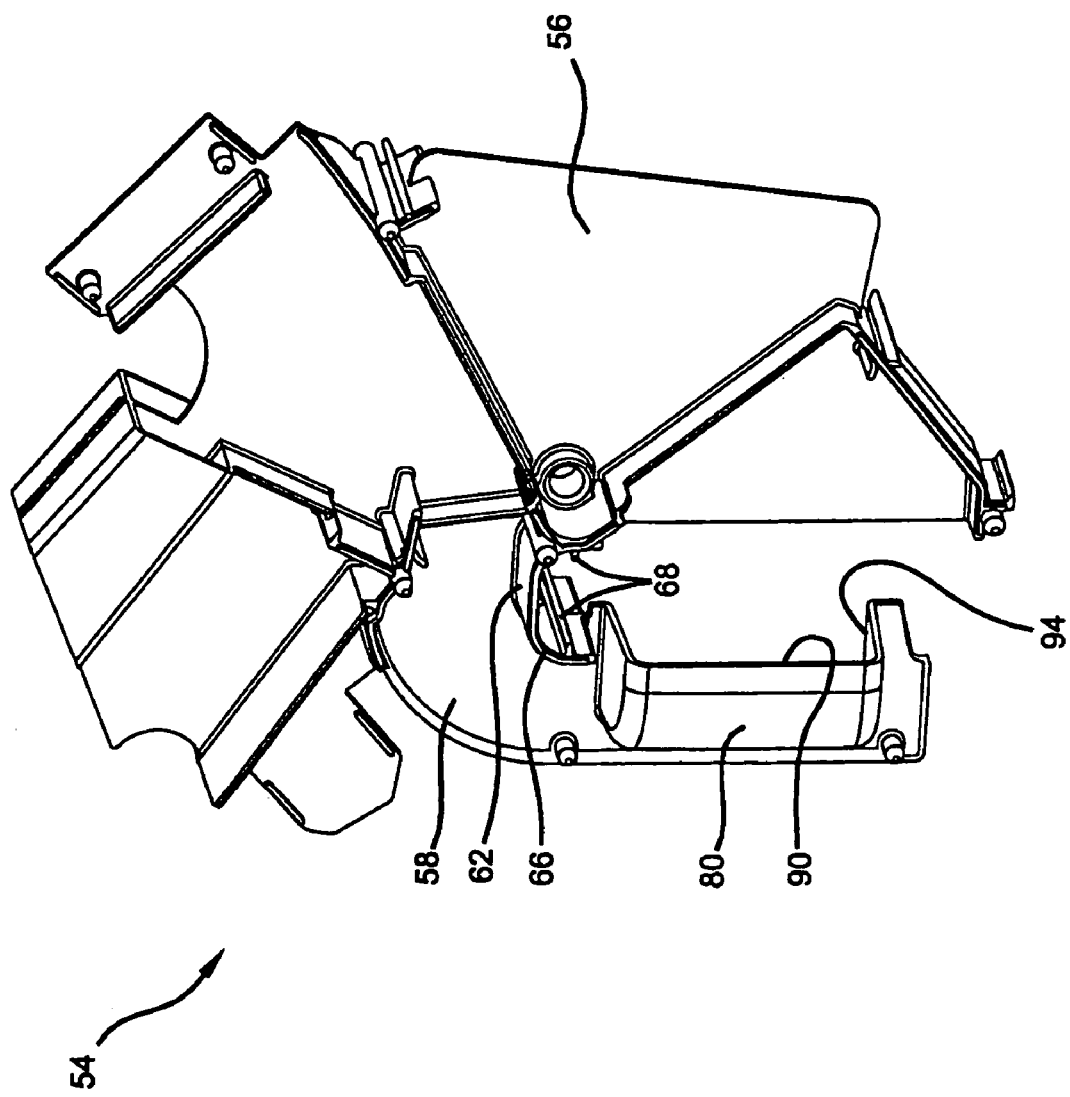
FIG. 3 is a perspective view of the HVAC case center plate according to the present teachings.
Figure 4:
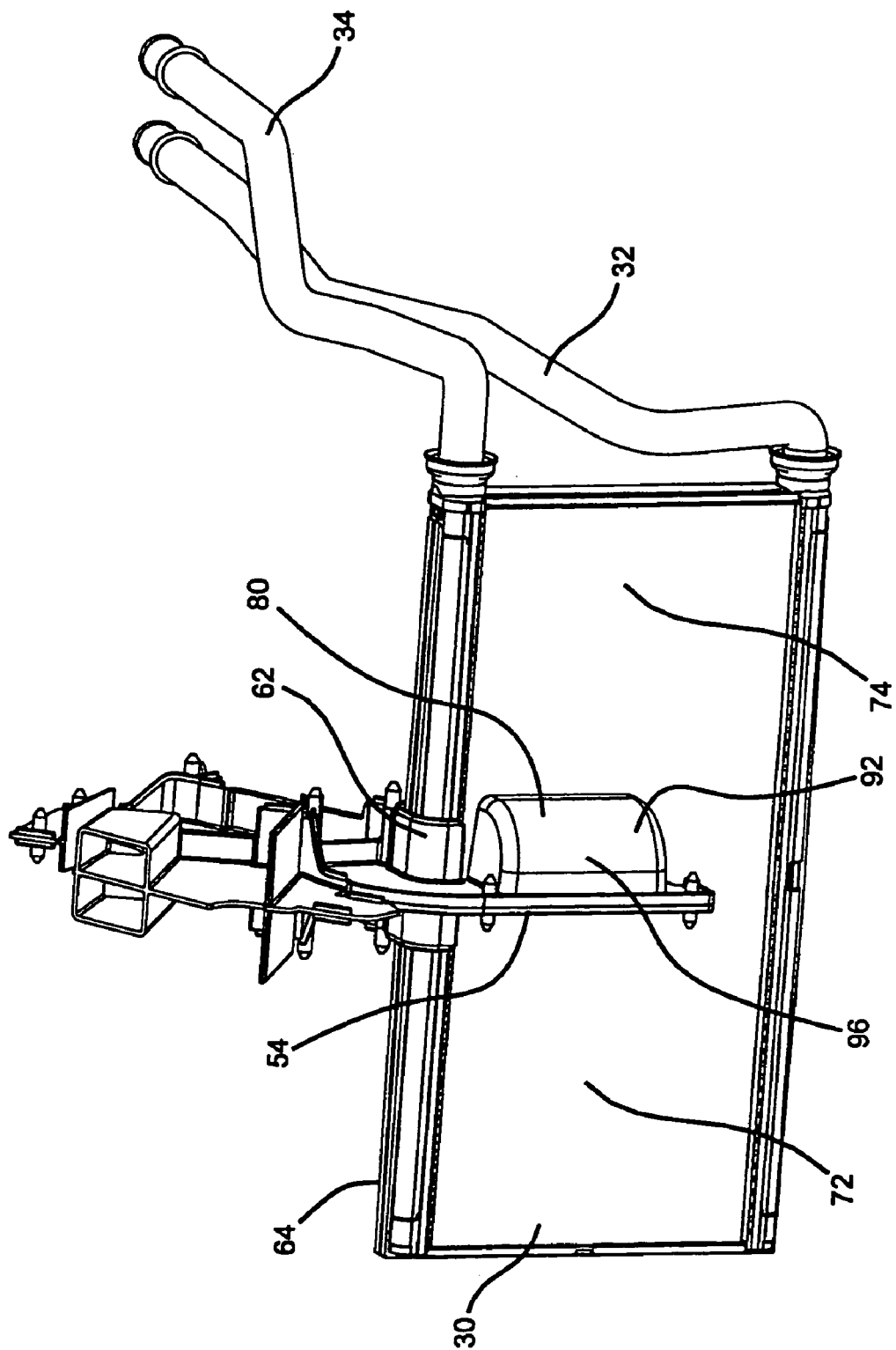
FIG. 4 is a perspective view of the center plate shown attached to the heater core in an assembled position.

With reference now to FIGS. 2–4, the HVAC case 20 according to the present teachings is shown. The HVAC case 20 includes a center plate 54 extending substantially transverse to the heater core 30. The center plate 54 is arranged substantially at a midpoint of a longitudinal axis of the heater core 30. The center plate 54 generally defines an upstream portion 56 extending upstream of the heater core 30 and a downstream portion 58 extending downstream of the heater core 30. An intermediate portion 60 includes an attachment portion 62 for coupling with an upper surface 64 of the heater core 30 in a saddle relationship. The attachment portion 62 generally includes an arcuate wall member 66 having locating tangs 68 for locating a ledge 70 formed on the heater core 30.

The center plate 54 is operable to divide the HVAC case 20 into a driver side region 72 and a passenger side region 74 (FIG. 4). An air diverting member 80 extends from the center plate 54 on the downstream portion 58 and is operable to redirect air on the downstream side of the heater core 30 from a first region to a second region to compensate for a temperature imbalance as will be described in further detail.

Figure 5:
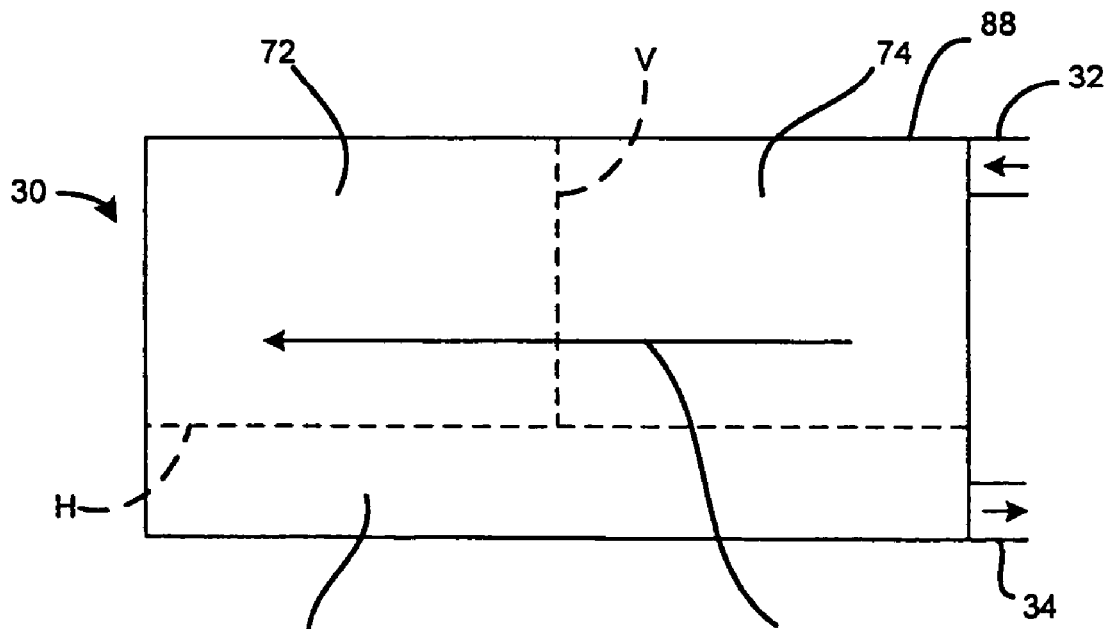
FIG. 5 is a diagrammatic representation of a temperature gradient of the heater core.

In order to appreciate the advantages realized by the center plate configuration according to the present teachings, a discussion of the operation of the heater core 30 is warranted. With additional reference now to FIG. 5, a diagrammatic representation of the heater core 30 is shown. At the outset dashed line V represents the vertical orientation of the center plate 54 with respect to the heater core 30. In this regard, line V represents a division in the downstream air from the heater core 30 between the driver side region 72 and the passenger side region 74. A horizontal dashed line H represents a lower zone 84 aligned for directing air to the rear passenger occupants.

The inlet and outlet pipes 32 and 34, respectively, are shown connected with the heater core 30 on a first end 88. It has been shown that the temperature experienced downstream of the heater core 30 across the plane of the heater core 30 is not uniform. In the example shown, a temperature gradient T is experienced that produces downstream airflow having reduced temperature from the first end 88 leftward as viewed from FIG. 5.

As explained above, the center plate 54 is arranged substantially at a midpoint along a longitudinal axis of the heater core 30. As a result of the positioning of the center plate 54 and the temperature gradient T experienced downstream of the heater core 30, the air diverting member 54 is adapted to divert air from the passenger side region 74 (warmer air) and deliver it to the driver side region 72 (less warm air). In this regard, the temperature imbalance that would otherwise influence warmer air being introduced into the passenger side region 74 than that of the driver side region 72 is compensated. As a result, the air temperature experienced between the driver's side and the passenger's side of the vehicle is modified to a more proportional level.

With specific reference now to FIGS. 3 and 4, the air diverting member 80 will be described in greater detail. The air diverting member 80 generally includes a first portion 90 aligned for accepting air at the passenger side region 74, an intermediate portion 92 and a second portion 94 for delivering the accepted air to the drivers side region 72. The first portion 90 of the air diverting member 80 defines an intake plane substantially parallel to the heater core plane. The second portion 94 of the air diverting member 80 defines an exhaust plane substantially transverse to the heater core plane. The intermediate portion 92 defines an annular wall 96 extending between the intake plane and the exhaust plane. The air diverting member 80 may comprise an integrally molded portion of the center plate 54 or may be a separate component adapted to be attached to the center plate 54. It is appreciated, that other shapes and configurations may be employed for the air diverting member 80 for directing downstream air from the passenger side region 74 to the driver side region 72.

Those skilled in the art can now appreciate from the foregoing description that the broad teachings of the present invention can be implemented in a variety of forms. For example, while the discussion of the temperature gradient associated with the heater core 30 has been described as having decreasing temperature leftward across a plane of the heater core, other temperature gradients may be experienced. For example, the temperature gradient may be shown to increase leftward across a plane of the heater core. In such an environment, a center plate may be provided having an air diverting member extending into the driver side zone for redirecting air from the drivers side zone in to the passenger side zone. Therefore, while this invention has been described in connection with particular examples thereof, the true scope of the invention should not be so limited since other modifications will become apparent to the skilled practitioner upon a study of the drawings, the specification and the following claims.

What is claimed is:

1. An HVAC assembly including an HVAC case disposed in a passenger compartment of a vehicle, the assembly comprising:

a heater core having an upstream side and a downstream side, said heater core accepting air from said upstream side and exhausting air to said downstream side, said exhausted air defining a temperature gradient along a plane of said heater core;

an inlet pipe, said inlet pipe located at a first end of said heater core and delivering coolant to a second end of said heater core;

an outlet pipe, said outlet pipe located at said first end of said heater core and below said inlet pipe, said outlet pipe receiving coolant from said second end of said heater core;

a center plate coupled to said heater core, said center plate being perpendicular to said plane of said heater core to define a first region of said temperature gradient and a second region of said temperature gradient caused by the flow of coolant through said heater core; and a non-pivoting air diverting member coupled to said center plate and positioned on said downstream side against said heater core, said air diverting member having a first scoop port portion aligned for accepting air from said first region of said heater core and a second port portion for delivering said accepted air toward said second region of said heater core wherein said first region has a higher air temperature than said second region.

2. The HVAC assembly of claim 1 wherein said first scoop portion portion of said air diverting member defines an intake plane substantially parallel to said heater core plane.

3. The HVAC assembly of claim 2 wherein said second port portion of said air diverting member defines an exhaust plane substantially transverse to said heater core plane.

4. The HVAC assembly of claim 2 wherein said air diverting member defines an annular wall extending between said intake plane and said exhaust plane.

5. The HVAC assembly of claim 1 wherein said center plate is arranged substantially at a midpoint of said heater core plane.

6. An HVAC assembly for delivering air to a passenger compartment of an automobile comprising:
- an HVAC case disposed in a passenger compartment of the automobile;
- a heater core disposed in said HVAC case and adapted to pass air through a plane of said heater core, said heater core influencing downstream air having a temperature gradient along said plane, said heater core further comprising:
- an inlet pipe, and
- an outlet pipe, wherein said pipes permit coolant to flow through said heater core resulting in said temperature gradient; and
- a non-pivoting air redirecting member disposed against said heater core in said HVAC case downstream of said heater core, said air redirecting member having an air accepting portion aligned to accept air from a first region of said temperature gradient, wherein said first region is closer to an inlet pipe of said heater core, and an air release portion aligned to release air into a second region of said temperature gradient, wherein said second region is farther from said inlet pipe of said heater core, wherein said first region defines a higher air temperature than said second region.

7. The HVAC assembly of claim 6 wherein said air redirecting member is disposed on a center plate, said center plate defining a longitudinal axis substantially transverse to said plane of said heater core.

8. The HVAC assembly of claim 7 wherein said center plate is coupled to said heater core.

9. The HVAC assembly of claim 7 wherein said air accepting portion of said air redirecting member defines an intake plane substantially parallel to said heater core plane.

10. The HVAC assembly of claim 9 wherein said air release portion of said air redirecting member defines an exhaust plane substantially transverse to said heater core plane.

11. The HVAC assembly of claim 10 wherein said air redirecting member defines an annular wall extending between said intake plane and said exhaust plane.

12. The HVAC assembly of claim 7 wherein said center plate is arranged substantially at a midpoint of said heater core plane.

13. An HVAC assembly for a vehicle, comprising:
- an HVAC case including a heater core having an upstream side and a downstream side, the downstream side having a temperature distribution along a plane of the heater core, the temperature distribution having a first region defining a higher air temperature than a second region;
- a plate member coupled to the heater core; and
- a non-pivoting air scoop arranged on said plate member and against said heater core for communicating with the downstream side, said air scoop having an intake portion arranged at the first region for accepting air and an exhaust portion for exhausting air to the second region.

14. The HVAC assembly of claim 13 wherein said plate member defines a longitudinal axis substantially transverse to a plane of the heater core.

15. The HVAC assembly of claim 14 wherein said intake portion of said air scoop defines an intake plane substantially parallel to said heater core plane.

16. The HVAC assembly of claim 15 wherein said exhaust portion of said air scoop defines an exhaust plane substantially transverse to said heater core plane.

17. The HVAC assembly of claim 16 wherein said air scoop defines an annular wall extending between said intake plane and said exhaust plane.

18. The HVAC assembly of claim 14 wherein said plate member is arranged substantially at a midpoint of said heater core plane.

* * * * *

UNITED STATES PATENT AND TRADEMARK OFFICE
CERTIFICATE OF CORRECTION

PATENT NO. : 7,137,445 B2 Page 1 of 1
APPLICATION NO. : 10/869727
DATED : November 21, 2006
INVENTOR(S) : Dan Kushner and Dan Archibald It is certified that error appears in the above-identified patent and that said Letters Patent is hereby corrected as shown below:

Column 4, Line 62: "below" should be -- above --

Signed and Sealed this

Twenty-ninth Day of April, 2008

JON W. DUDAS
*Director of the United States Patent and Trademark Office*